United States Patent Office 2,961,379
Patented Nov. 22, 1960

2,961,379

CONTROL OF CALCIUM TO INCREASE DEXTRANSUCRASE

Wesley Brock Neely, Midland, Mich., assignor to The Dow Chemical Company, Midland, Mich., a corporation of Delaware No Drawing. Filed Feb. 10, 1959, Ser. No. 792,265

4 Claims. (Cl. 195—31)

This invention relates to the production of dextransucrase and in particular to a technique for the improvement of the activity of the dextransucrase so as to facilitate the production of dextran.

Gum dextran, or dextran, is a water-soluble polysaccharide produced by an enzyme formed in the fermentation of bacteria, *Leuconostoc mesenteroides*. The material has many industrial uses and its production is limited to fementation methods.

In the enzymatic production of the polysaccharides generally identified as dextran, the economic problem is generally one of obtaining a sufficiently active enzyme solution from a culture of *Leuconostoc mesenteroides* bacteria. Various means are practiced in the industrial arts for accomplishing the result, not the least of which seems to be the direct cultivation of the bacteria in a sugar tankage medium where the enzyme is generated in situ.

It is a fundamental object of the present invention to provide a process for producing this enzyme at an increased level of activity or at an increased concentration in solution so as to shorten the incubation period involved in obtaining a maximum yield of dextran.

Other objects and advantages of the invention will in part be obvious and in part appear hereinafter.

I have determined from analysis, study and observation of the dextransucrase system that there is a distinct measurable requirement for free calcium ion in the solution if maximum activity of the bacteria charge is to be obtained and, accordingly, have devised a process for the production of dextransucrase enzyme in which characteristically, I maintain a level in the range from about 5 to 50 parts per million preferably of about 10 parts per million to 20 parts per million of the solution of free calcium ion, free zinc ion, or mixture of the two, whereby I have determined that there is obtained in the culture medium an increase of 50 to 100 percent in the enzyme activity.

A common medium for the growth of the bacteria consists of a solution containing substantially the following: Yeast extract 2.0 percent, Sucrose 2.0 percent, $K_2HPO_4$ 2.0 percent, R salt, 0.5 percent (R salts contain $MgSO_4.7H_2O$ 40 grams, NaCl 2 grams, $FeSO_4.7H_2O$ 2 grams, and $MnSO_4.H_2O$ 2 grams, made up to 1 liter) and $H_3PO_4$ 0.1 percent. This medium is inoculated with an active culture of *Leuconostoc mesenteroides*. At the end of 24 hours the pH is adjusted to 5.2 and the solution centrifuged. The resulting clear amber solution contains the enzyme dextransucrase which is capable of forming the polymer dextran from sucrose.

I have found that through the cultivation of the same bacteria in fundamentally the same medium, but with addition of calcium chloride at the rate of 1 milligram of calcium ion per 100 milliliters of the solution by volume, there is produced an increase of activity of the order of 50 to 100 percent of the dextransucrase solution. By repetition of tests and measurement in a variety of conditions, I have determined that virtually any calcium salt such as nitrate or the like, which is soluble to the extent of 1 milligram of calcium ion per 100 milliliters or more will be about as effective as the calcium chloride employed in the experiments. It appears that the physiological processes of the bacteria in the medium require a certain minimum level of the calcium ion which is probably obtained in most aqueous solutions through the presence of natural calcium as a contaminant in the water. By bringing the calcium level of any medium up to an optimum plateau in the range from about 10 to about 20 parts per million. I have found the activity of the solution in the production of dextransucrase is increased at least 50 to about 100 percent.

Following the technique described in the example for growth of the bacteria to generate the enzyme in conventional solution, the tests were repeated in a number of cycles in which essentially the same medium was reproduced and different levels of calcium ion included therein. The medium was thus incubated for standard periods of time and the activity of the enzyme solution subsequently determined using accepted technique, the results of the experiments are illustrated in the following table:

TABLE I

*Effect of $Ca^{++}$ on dextransucrase activity*

| $Ca^{++}$ concentration, milligram/100 ml. of media: | Activity, units |
|---|---|
| 0 | [1] 5 |
| 0.4 milligram | 27 |
| 0.8 milligram | 35 |
| 1.0 milligram | 39 |
| 2.0 milligrams | 40 |

[1] The reason for the low value as compared to literature values is that a 14-hour incubation period was used instead of the conventional 24 hours.

Analysis of the results of the table indicates that an amount of calcium ion in the solution approximating one-half milligram per 100 milliliters indicates that commencement of a significant level of increased activity, which appears to settle to a plateau level in a range from about 0.9 milligram to substantially 2 milligrams per 100 milliliters. In other words, no significant return of increased enzyme activity is observed with increase in concentration of the calcium ion beyond about 0.9 part to 2 milligrams per 100 milliliters.

Similar, but less pronounced effects are obtained through the utilization of zinc ion.

That is, parallel tests, using the same culture medium but tested with addition of zinc and mixtures of calcium and zinc in all proportions give parallel results when the free metal ion content is in the range of about 10 to 20 parts per million. Useful salts are the chlorides because the anions are compatible with the living organisms. However, the nitrates are also useful.

Though the invention has been described with reference to only a limited number of examples, it is to be understood that variants thereof may be practiced without departing from its spirit or scope.

What is claimed is:

1. The method of producing dextransucrase comprising, fermenting a polysaccharide substrate in the presence of the bacteria species *Leuconostoc mesenteroides* and the nutrient medium therefor, which is characterized by its containing an ion selected from the group consisting of calcium and zinc, wherein the amount of the metal ion in the solution is maintained at a level of about 5 to about 50 parts per million.

2. The method in accordance with claim 1 in which the metal ion is zinc and it is held at a concentration in the range from about 10 to 20 parts per million.

3. The method in accordance with claim 1 in which the mteal ion is zinc and it is held at a concentration in the range from about 10 to 20 parts per million.

4. The method in accordance with claim 1 in which the metal ion is a mixture of calcium and zinc and it is held at a concentration in the range from about 10 to 20 parts per million.

References Cited in the file of this patent

J. Biological Chemistry, vol. 163, pp. 221–22 (1946).

UNITED STATES PATENT OFFICE
CERTIFICATION OF CORRECTION

Patent No. 2,961,379

November 22, 1960

Wesley Brock Neely

It is hereby certified that error appears in the above numbered patent requiring correction and that the said Letters Patent should read as corrected below.

Column 3, line 1, for "zinc" read -- calcium --.

Signed and sealed this 25th day of July 1961.

(SEAL)
Attest:

ERNEST W. SWIDER
Attesting Officer

DAVID L. LADD
Commissioner of Patents